United States Patent [19]

Nishiguchi et al.

[11] 4,157,738
[45] Jun. 12, 1979

[54] METHOD FOR COUNTING THE NUMBER OF ARTICLES USING A WEIGHING MACHINE

[75] Inventors: Yuzuru Nishiguchi; Utaro Fujioka, both of Tokyo, Japan

[73] Assignee: Shinko Denshi Company Limited, Tokyo, Japan

[21] Appl. No.: 899,906

[22] Filed: Apr. 26, 1978

[30] Foreign Application Priority Data

May 15, 1977 [JP] Japan .................................. 52/55800

[51] Int. Cl.² ............................................. G01G 19/42
[52] U.S. Cl. .......................................... 177/1; 177/25; 177/200; 235/92 WT; 364/567
[58] Field of Search ............................ 177/1, 25, 200; 364/567; 235/92 WT

[56] References Cited

U.S. PATENT DOCUMENTS 3,716,706  2/1973  Gray .................................. 177/25 X
4,043,412  8/1977  Rock ...................................... 177/25

Primary Examiner—Joseph W. Hartary
Attorney, Agent, or Firm—Lawrence I. Field

[57] ABSTRACT

A method for counting the number of articles or goods of the same kind using a weighing machine which comprises a step of measuring an average or mean weight of sample articles, a step of measuring a weight of all articles to be counted and a step of calculating the number of the all articles by dividing the measured weight by the mean weight. Said step of measuring the mean weight includes a step of measuring a temporary mean weight $a_1$ of a known small number of articles $P_1$, a step of adding any unknown number of articles $P_2$, a step of measuring a weight $W_1$ of these articles $P_1$ plus $P_2$, a step of calculating the number $N_1$ of the articles by rounding off a quotient obtained by dividing the weight $W_1$ by the temporary mean weight $a_1$ and a step of calculating a standard mean weight $a_2$ by dividing said measured weight $W_1$ by said calculated number $N_1$.

4 Claims, 7 Drawing Figures

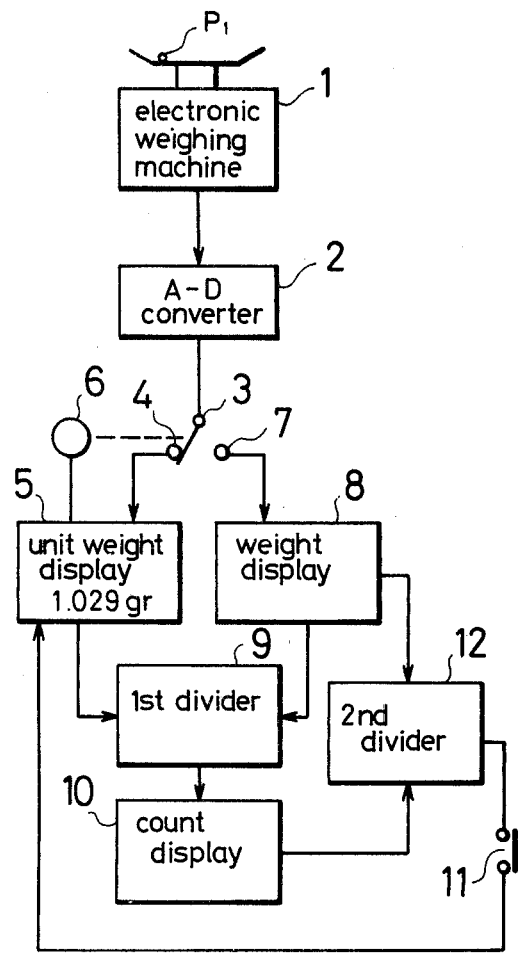
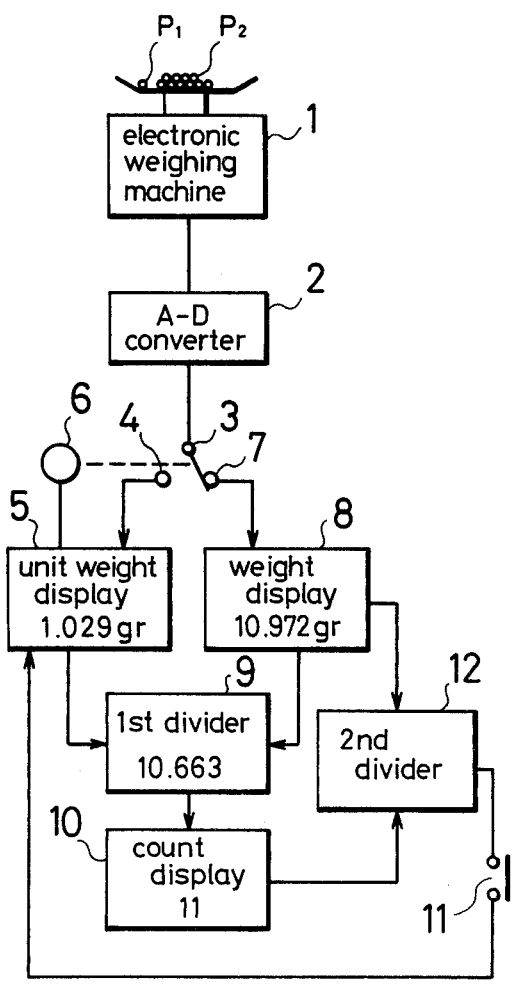

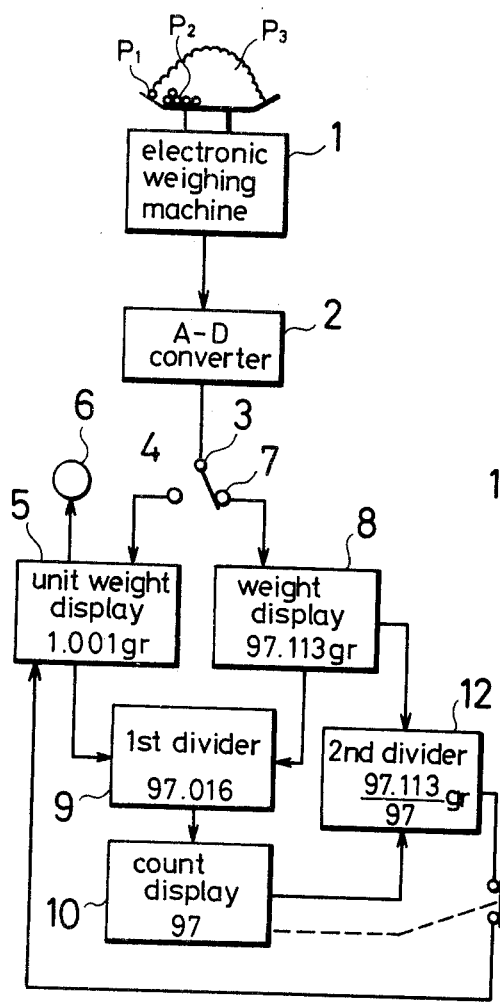
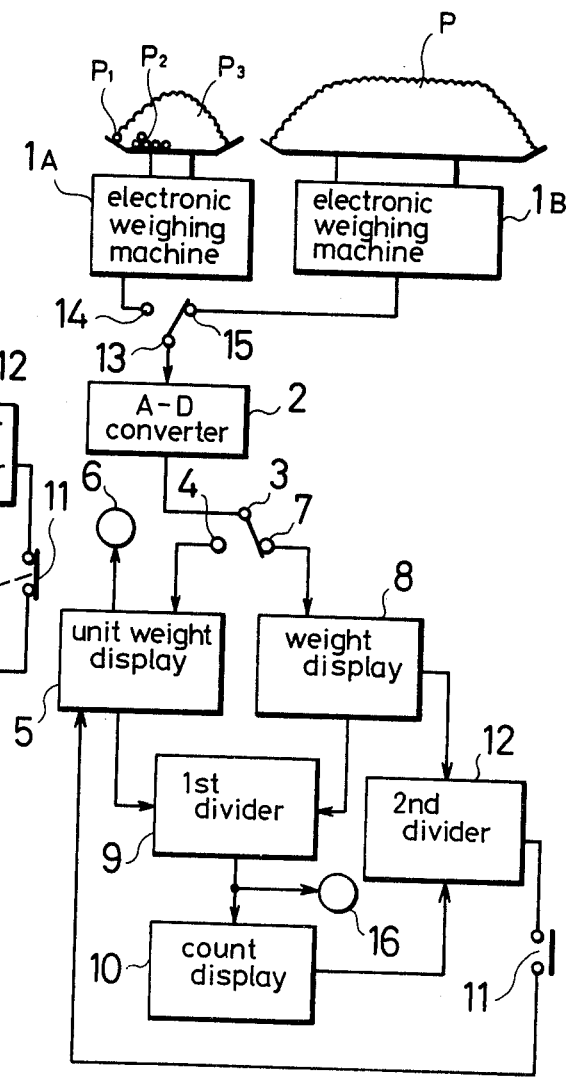

METHOD FOR COUNTING THE NUMBER OF ARTICLES USING A WEIGHING MACHINE

BACKGROUND OF THE INVENTION

The present invention relates to a method for counting the number of articles or goods of the same kind using a weighing machine.

In processes of manufacturing articles it is often required to count quickly the number of articles or goods of the same kind. For this purpose such an indirect counting method has been widely used that instead of counting directly the articles one by one a total weight of the articles to be counted is first measured using a weighing machine and then the measured total weight is divided by a unit weight of the single article to obtain the number of the articles. However such a known method has inherently a disadvantage that if the goods have different weights, a counting error occurs theoretically. For instance, when a weight of a sample article is lighter or heavier than a mean weight of the articles to be counted by x%, a count value or figure calculated from the total weight of the articles includes an error of ±x%. Moreover in the actual weighing machine there is always a measuring error as well as a finite resolution and thus an actual error is always introduced other than the above mentioned theoretical error. For example, if the sample article of 1 gr is measured by using a weighing machine having an accuracy or resolution of 0.1 gr, there might be produced an error of 0.1 gr for 1 gr. That is the measured value includes an error of 10%. Thus when the number of articles is calculated with using such an erroneous unit weight, there might be produced a large error up to 10%. Such a large error is not acceptable in practice.

In order to avoid the theoretical and practical errors it has been proposed to adopt as a unit weight a mean weight of a number of sample articles such as thirty two or a hundred articles. But this method has also a disadvantage that many sample articles must be counted one by one manually and this does not meet an inherent object of a counting scale which can count the number of articles automatically or semi-automatically. Further a step of counting the number of many sample articles requires a lot of time, labour work and cencentration, which affects the practical use of the known counting scales.

As explained above in the known methods when the number of sample articles is small a large counting error is introduced, whilst when a large number of articles is used as samples, although a counting error can be decreased it is quite cumbersome to count such a large number of sample articles.

SUMMARY OF THE INVENTION

The present invention has for its object to provide a method for counting the number of articles or parts with using a weighing machine, which method can obviate the above mentioned drawbacks of the known methods by counting semi-automatically the number of any number of sample articles so as to obtain an accurate mean weight of the sample articles and by calculating the accurate total number of articles to be counted with using said accurate mean weight.

To this end a counting method according to the invention comprises successively a step of measuring a temporary mean weight of a known small number of articles, a step of adding to said small number of articles any unknown number of articles, a step of measuring a weight of these articles, a step of calculating the number of the articles by rounding off a quotient which is obtained by dividing said measured weight by said temporary mean weight, a step of calculating a standard mean weight by dividing said measured weight by said calculated number, a step of measuring a weight of all articles to be counted and a step of calculating the total number of all articles by rounding off a quotient which is obtained by dividing said measured weight of all articles by said standard mean weight.

BRIEF EXPLANATION OF THE DRAWINGS

FIGS. 2, 3, 4, 5 and 6 are block diagrams illustrating situations of a counting apparatus the present method at various steps; and FIG. 7 is a block diagram showing another embodiment of the counting apparatus the method according to the invention.

DESCRIPTION OF THE PREFERRED EMDODIMENTS

Figure 1:
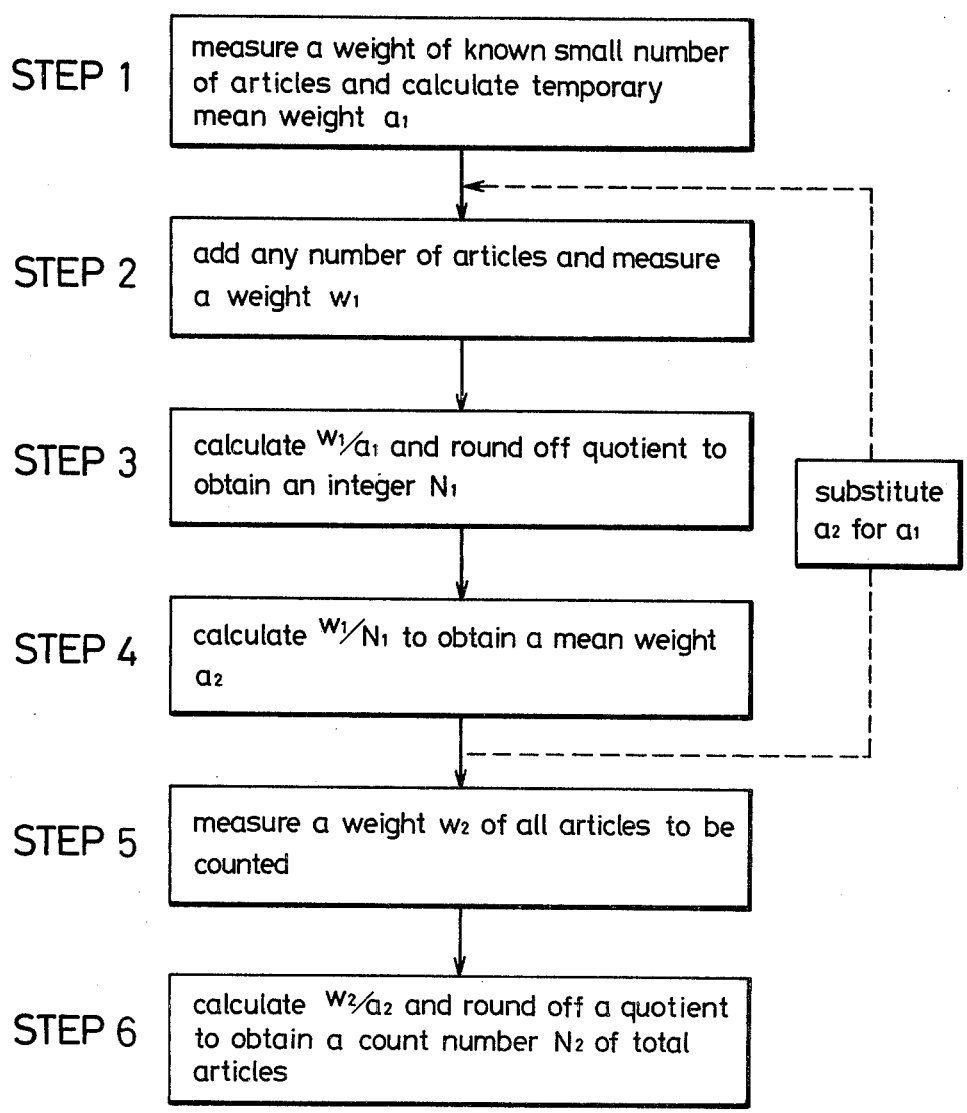
FIG. 1 is a flow chart showing successive steps of a counting method according to the invention.

FIG. 1 is a flow chart illustrating successive steps of a counting method according to the invention.

(1) STEP 1

At first a weight of a known small number of articles such as one or several articles is measured with a weighing machine such as an electronic scale. Then a temporary mean weight $a_1$ is calculated by dividing the measured weight by the known small number and the calculated temporary mean weight $a_1$ is stored. In case of using a single article as a sample it is not necessary to effect said division.

(2) STEP 2

Next any unknown number of articles are added to said known small number of articles and a weight $W_1$ of these articles is measured by the weighing machine. The measured weight $W_1$ is stored.

(3) STEP 3

The stored weight $W_1$ is divided by the stored temporary mean weight $a_1$ and a quotient is rounded off so as to obtain an integer number $N_1$. This number $N_1$ is an estimated number of the articles measured in the step 2. The number $N_1$ is stored in a memory.

(4) STEP 4

The measured weight $W_1$ is divided by the integer $N_1$ so as to calculate a mean weight $a_2$ of these articles. This standard mean weight $a_2$ is stored.

(5) STEP 5

A weight $W_2$ of total articles to be counted is measured with the weighing machine. The measured total weight $W_2$ is stored.

(6) STEP 6

The stored weight $W_2$ is divided by the standard mean weight $a_2$. A quotient of this division is rounded off so as to calculate an integer number $N_2$. This integer number $N_2$ is displayed as the count number of the total articles.

The above mentioned steps except for the steps of putting the articles on the weighing machine are carried out substantially automatically in accordance with a given sequence and thus the actual counting can be effected within several seconds.

It is possible to improve further an accuracy of the standard mean weight $a_2$ obtained in the step 5 by repeating several times the steps 2 to 4 as shown by a dotted line in FIG. 1. During each of this repeating operation any number of articles are added and the temporary mean weight $a_1$ is every time replaced by the new mean weight $a_2$. In this manner a very accurate standard mean weight can be obtained.

Next the counting method according to the invention will be explained in detail with reference to a circuit shown in FIG. 2 and numerical examples. For the sake of simplicity it is assumed that a weighing machine has no measuring error and the weight of articles to be counted have variations which follow a normal distribution. For example, the articles have an average or mean weight of 1 gr and a standard deviation $\sigma$ of 0.01 gr. In the normal distribution 99.73% of whole articles are included within $\pm 3\sigma$. Therefore when an arbitrary single sample is selected among a number of articles, a probability that the sample is lighter than 0.97 gr or heavier than 1.03 gr is only 0.27% and thus such a case may be neglected.

In FIG. 2 when a single article $P_1$ is put on an electronic weighing machine 1 as a sample, an analog signal corresponding to a weight $a_1$ of the article $P_1$ is produced. This analog signal is converted by an analog-digital converter 2 into a digital signal representing the weight $a_1$. This digital signal is supplied through a switch 3 and one of its contacts 4 to a unit weight display device 5. This device 5 displays the measured weight $a_1$ as, for example 1.029 gr. At the same time this digital value is stored and a lamp 6 is lighted on. Then the switch 3 changes automatically its position into the other contact 7.

Figure 4:
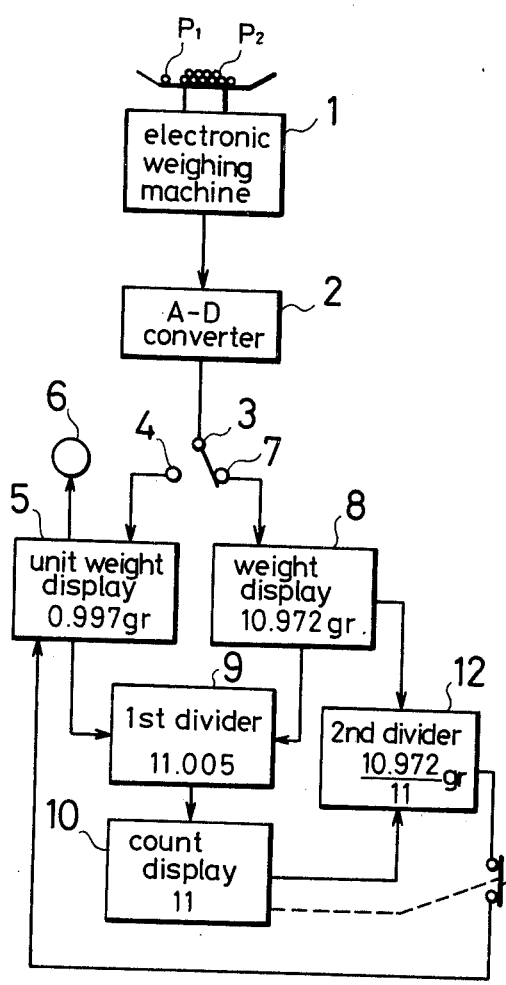

After an operator confirms the light of the lamp 6, he puts an unknown small number of articles $P_2$ such as about ten articles on the electronic weighing machine 1 in addition to the previous sample $P_1$ as shown in FIG. 3. Then an analog signal representing a measured weight $W_1$ of the articles $P_1$ plus $P_2$ is supplied through the A-D converter 2 and the contact 7 of the switch 3 to a weight display device 8. The device 8 displays the measured weight $W_1$ in the digital form such as 10.972 gr. This digital value $W_1$ is supplied to a first divider 9 to which is also supplied the unit weight $a_1$ stored in the unit weight display device 5. In the first divider 9 the measured weight $W_1$ is divided by the unit weight $a_1$ and a quotient 10.663 is calculated. This quotient is rounded off, that is to say fractions of more than 0.5 is counted as one and the rest is cut away, so as to produce an integer number $N_1$ of 11. This integer number 11 is supplied to a count number or figure display device 10 and displayed thereby. After the count number 11 has been displayed a contact 11 is temporarily made closed as shown in FIG. 4 and is returned automatically into the initial open state. The measured weight $W_1$ stored in the weight display device 8 and the integer number $N_1$ displayed by the count number display device 10 are supplied to a second divider 12 in which $W_1$ of 10.972 gr is divided by the number $N_1$ of 11 to produce a standard mean weight $a_2$ of 0.997 gr. During the closed period of the contact 11 the standard mean weight $a_2$ is supplied to the unit weight display device 5 and the previously stored unit weight $a_1$ of 1.029 is replaced by the standard mean weight $a_2$ of 0.997 gr. It is preferrable for the actual counting operation that the lamp 6 is remained lighted off during a time interval from the step of adding the unknown small number of articles $P_2$ to the step of storing the standard mean weight $a_2$.

In summarizing the operations shown in FIG. 2 to FIG. 4 the number $N_1$ of 11 of the articles $P_1$ plus $P_2$ is calculated on the basis of the unit weight $a_1$ of the single sample article $P_1$ and the standard mean weight $a_2$ of 0.997 gr is calculated by dividing the weight $W_1$ of the articles $P_1$ plus $P_2$ by the calculated number $N_1$.

Figure 5:
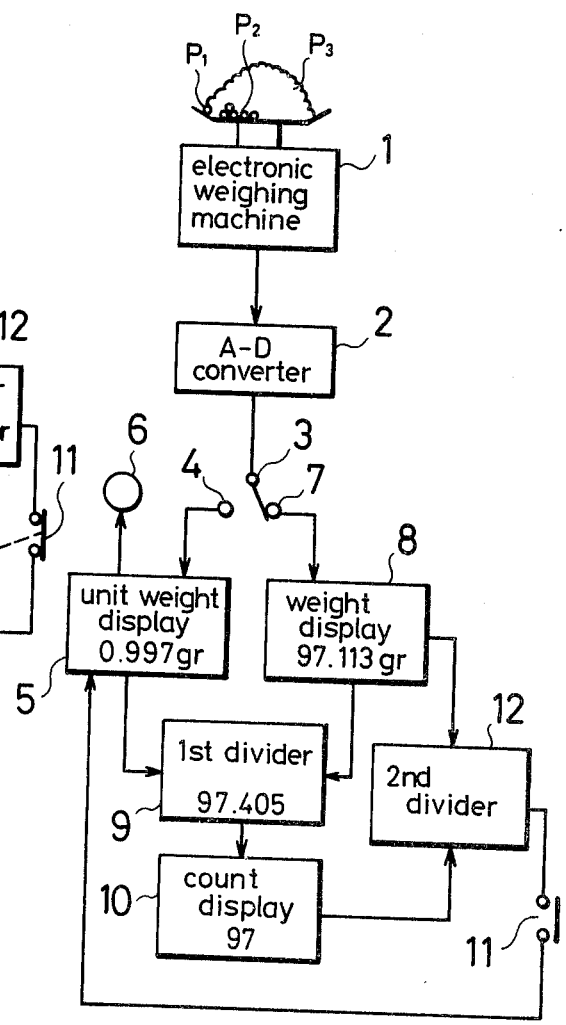

Next an operation for further improving an accuracy of the standard mean weight $a_2$ will be explained. To this end the number of the sample articles $P_1$ and $P_2$ is increased. Following to the operation shown in FIG. 4 an unknown number of articles $P_3$ is put on the electronic weighting machine 1 as illustrated in FIG. 5. Then the measured weight is displayed by the weight display device 8 as in the similar manner explained with reference to FIGS. 3 and 4. In this example the weight of 97.113 gr is displayed. In the first divider 9 this weight is divided by the standard mean weight $a_2$ of 0.997 gr stored in the unit weight display device 5. A quotient of this division is 97.405 and is rounded off into 97 which is displayed by the count number display device 10. Next as shown in FIG. 6 in the second divider 12 the weight of 97.113 gr is divided by the count number of 97 and a quotient of 1.001 gr is stored in the unit weight display device 5 instead of the previous standard mean weight of 0.997 gr. The situation of FIG. 6 means that the number of the samples $P_1$, $P_2$ and $P_3$ is 97 and its mean weight is 1.001 gr.

In the above preliminary operation the standard mean weight can be obtained accurately. Then the number of all articles to be counted can be obtained precisely only by putting all articles and a calculated count number is displayed on the count number display device 10. That is to say the number of all articles is calculated by dividing the weight of all articles by the standard mean weight and rounding off a quotient obtained by this division into an integer number.

FIG. 7 shows another embodiment of the invention in which there are provided two electronic weighing machines, i.e. a large (capacity) weighing machine 1B for measuring a weight of all articles to be counted and a small (capacity) weighing machine 1A for measuring a relatively small number of sample articles. In this embodiment there is further provided a switch 13 between these electronic weighing machines 1A, 1B and the A-D converter 2. After the standard mean weight has been measured by means of the small (capacity) weighing machine 1A the switch 13 is changed from a contact 14 to a contact 15 and an electric output signal from the large (capacity) weighing machine 1B on which all of articles P to be counted are put is supplied to the A-D converter 2.

In general, it is very difficult to make completely zero the counting error particularly in case that a variation of weight of articles to be counted is relatively large and the number of articles is very large such as 5000 or 10,000. In order to measure the standard mean weight in a more accurate manner, it is necessary to obviate the counting error in case of counting at least about a hundred sample articles. For example, if a hundred sample articles is erroneously counted as ninty nine and the standard mean weight is calculated based on this erroneous count, there might be produced a large error amouting to 1%, i.e. a hundred articles in case of measuring 10,000 articles. Next some important items concerning to the method according to the invention for avoiding such a counting error will be explained.

As in the case mentioned above it is assumed that the average weight of the sample articles is 1 gr and a standard deviation $\sigma$ is 0.01 gr. A possibility that a single sample lighter than 0.97 gr or heavier than 1.03 gr is very small and thus such a case can be neglected. But in the worst case it may be assumed that a single article of 1.03 gr is chosen as a sample and this weight is determined as the temporary mean weight. Then twenty sample articles having an average weight of 0.999 gr are added to said single sample. A whole weight of the sample articles is 1.03 gr+0.999 gr×20=21.01 gr. When this weight is divided by the temporary mean weight of 1.03 gr, a quotient of 20.398 is obtained. This quotient is rounded off into an integer number of 20 which is apparently smaller than the true count of 21 by one. In the numerical example explained with reference to FIGS. 3 and 4 although the variation of weights of the sample articles is similar to that just explained above, that is the weight of the first single sample is 1.029 gr and the mean weight of the sample articles added to the first one is (10.927 gr−1.029 gr)÷10=0.9943 gr, there is not produced an erroneous count. This is due to the fact that in the first numerical example the number of the added sample articles is much smaller than the second example. As can be understood from these examples, if the sample articles have a variation in weight corresponding to the standard deviation of about 1%, the number of added samples should be smaller than ten and if about twenty samples have to be added, these samples should be added twice so as to calculate a more accurate standard mean weight.

In order to decrease a possibility of error counts according to the invention it is advisable to put on the electronic weighing machine a small number of samples such as four instead of the single sample. It is preferrable to choose said small number of sample articles which can be counted instantaneously at sight and can be easily taken out. In this case an average weight of these samples such as four articles is calculated with using a suitable device such as a decoder and the calculated mean weight is supplied to the unit weight display device 5. In this case since the standard deviation of the mean weight of these four sample articles never amounts to 3σ from a statistical view point a count error is scarcely produced even if about twenty samples are added at once. Further it is effective to increase the number of initial sample articles for mitigating a practical problem that an error of the weighing machine affects the measured value if the weight to be measured is light.

Although it is necessary to consider the operation and mechanism of the method according to the invention so as to remove completely or substantially the counting error, it is not preferrable from the practical view point that the apparatus becomes too complicated and expensive and the operation becomes complex. It will be practical that the apparatus is simplified to such an extent that it includes statistically one or two erroneous countings among a hundred counting operations and when an erroneous counting might occur, a warning is produced so as to recommence the counting operation.

To this end in the embodiment shown in FIG. 7 there is provided a warning lamp 16 between the first divider 9 and the count display device 10. When a fraction α of the quotient of the division is about 0.5, i.e. $0.4 \leq \alpha < 0.6$, the lamp 16 is made lighted on so as to signal the warning to the operator. If a fraction of the quotient of the division is about 0.5, it is not always insured that the integer number obtained by rounding off the quotient represents a true count number, and a possibility of a count error of one count is rather great. For instance, in the example shown in FIG. 5 the quotient produced by the first divider 9 is 97.405 and thus the warning lamp 16 is once lighted on, but after a short time the situation is changed as shown in FIG. 6 and the quotient is corrected into 97.016. Thus the warning lamp 16 is soon lighted off. In this manner when the lamp 16 is lighted on only for a short time, it may be considered that the erroneous counting could not be done. However if the quotient is, for example 97.421 even after the correction shown in FIG. 6 has been effected and the warning lamp 16 remains lighted on, an erroneous counting might occur and thus it is suitable to recommence the sampling or measuring with adding the articles.

In the above explanation the unit weight display device 5, the weight display device 8 and the first divider 9 are explained as to display the measured and calculated values, but this is only for the sake of understanding the operations and in practice only the count number display device 10 has the displaying function. Further the operating circuitry may be any arrangement other than that explained above. For instance, this operating circuitry may be easily realized by means of a simple micro processor of about four bits.

As explained above in accordance with the present method the accuracy of the calculated mean weight is highly improved and as the result very accurate count of the articles or goods can be measured, because at first the known small number of sample articles are measured so as to obtain the temporary mean weight, then any number of sample articles are added, the measured weight is divided by the temporary mean weight, the quotient of this division is rounded off so as to obtain the whole sample number, and then the total weight of the sample articles is divided by the sample number so as to calculate the standard mean weight.

What is claimed is:
1. A method for counting the number of articles of the same kind with using a weighing machine comprising successively
   a step of measuring a temporary mean weight of a known small number of articles;
   a step of adding to said small number of articles any unknown number of articles;
   a step of measuring a weight of these articles;
   a step of calculating the number of the articles by rounding off a quotient which is obtained by dividing said measured weight by said temporary mean weight;
   a step of calculating a standard mean weight by dividing said measured weight by said calculated number;
   a step of measuring a weight of all articles to be counted; and
   a step of calculating the total number of said all articles by rounding off a quotient which is obtained by dividing said measured weight of said all articles by said standard mean weight.
2. A method according to claim 1, wherein said method further comprises after the step of calculating the standard mean weight a step of adding any unknown number of articles, a step of measuring a weight of the articles, a step of calculating the number of the articles by rounding off a quotient which is obtained by dividing the measured weight by the standard mean weight, and a step of calculating a new standard weight by dividing the measured weight by the calculated number of the articles.
3. A method according to claim 1, wherein a warning is generated when a fraction of a quotient which is obtained by dividing the measured weight by one of the temporary mean weight and the standard mean weight is larger than or equal to 0.4 and smaller than 0.6.

4. A method according to claim 1, wherein the temporary mean weight and the standard mean weight are calculated from the weights of the sample articles measured by a first weighing machine of a small capacity and the total number of the articles to be counted is calculated from the weight of the articles measured by a second weighing machine of a large capacity.

* * * * *